United States Patent [19]
Gruber

[11] 3,948,004
[45] Apr. 6, 1976

[54] APPARATUS FOR PRODUCING AN ELECTRICAL REMOVAL SIGNAL CORRESPONDING TO LATERAL AND RADIAL FORCE LOADS ON A TIRE

[75] Inventor: Peter Max Gruber, Pfungstadt, Germany

[73] Assignee: Gebr. Hofmann KG, Darmstadt, Germany

[22] Filed: Aug. 28, 1974

[21] Appl. No.: 501,435

[30] Foreign Application Priority Data
Aug. 30, 1973 Germany............................ 2343841

[52] U.S. Cl................................. 51/165 R; 73/146
[51] Int. Cl.².......................................... B24B 49/16
[58] Field of Search....... 51/106 R, 165 R, DIG. 33; 73/146, 66; 157/13

[56] References Cited
UNITED STATES PATENTS

| | | | |
|---|---|---|---|
| 3,375,714 | 4/1968 | Bottasso........................ | 51/DIG. 33 |
| 3,543,576 | 12/1970 | Bishop........................... | 51/DIG. 33 |
| 3,553,903 | 1/1971 | Christie.......................... | 157/13 X |
| 3,724,137 | 4/1973 | Hofelt............................ | 51/DIG. 33 |
| 3,739,533 | 6/1973 | Iida................................ | 51/165 R |

Primary Examiner—Al Lawrence Smith
Assistant Examiner—Nicholas P. Godici
Attorney, Agent, or Firm—Cushman, Darby & Cushman

[57] ABSTRACT

An apparatus whereby the lateral and radial forces arising in a loaded tire — either standing or rolling — are detected and signals produced to control grinding units as a function of both forces to remove material and reduce or eliminate non-uniformities.

3 Claims, 3 Drawing Figures

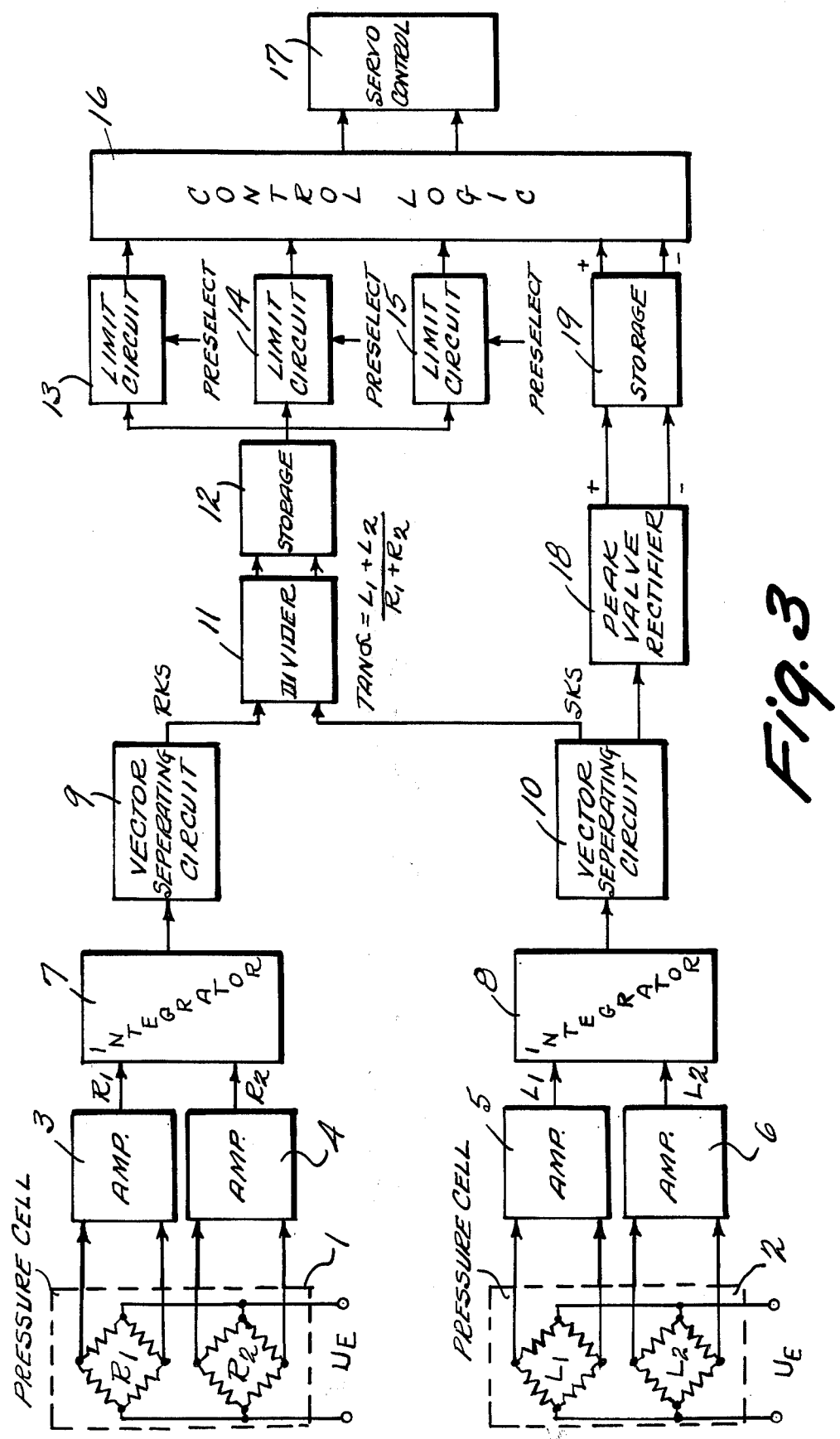

APPARATUS FOR PRODUCING AN ELECTRICAL REMOVAL SIGNAL CORRESPONDING TO LATERAL AND RADIAL FORCE LOADS ON A TIRE

The invention relates to a method of reducing or eliminating non-uniformities in tires of motor vehicles, with which forces arising in a loaded tire standing still or rolling off, are measured and with which material is removed from the tire in accordance with the angular positions and the amounts of the forces, as well as to a device for applying this method, provided with force-measuring units and material-removing means, especially in the form of grinding wheels controlled by the force-measuring units.

Tires standing on or rolling off a surface produce forces in radial, lateral and tangential direction. Due to the overlapping of the individual forces and due to the fact that the tangential, lateral and radial forces do not act exactly in the middle of the foot print area of the tire, moments arise in addition which act around the vertical axis of the tire and a line perpendicular to the vertical axis.

Methods and devices are known (German Pat. application No. 1,779,156) with which non-uniformities in a motor vehicle tire acting in a radial direction, so-called radial force variations, are reduced on the rotating tire by repeated grinding, generally carried out in the outer tread areas, the so-called tire shoulders. If several grinding wheels are used, they are approached to the tire simultaneously in accordance with the angular position of the maximum radial force variations.

In the German Pat. application No. 1,755,329 a method is set forth in which the pressing-in differences are measured at each side of the tire, and corresponding amounts of material are removed from each side of the tire according to the pressing-in force differences. In this way axial pressing-in differences can be avoided.

With this known method, the lateral forces arising in a loaded standing tire or in a rolling-off tire of a motor vehicle are not considered. With the known methods, only forces acting in radial direction are measured and the grinding procedures controlled correspondingly. It has turned out, however, that lateral forces can be greater than radial forces and that they are possibly even increased by the compensation of the radical forces.

It is therefore the object of the invention to describe a method of and a device for reducing or eliminating non-uniformities in motor vehicle tires, in which the individual forces and momemts arising during the examination are considered with regard to the removal of material.

This object is achieved according to the invention by measuring the lateral, as well as the radial forces, and by removing material according to these forces, considering the lateral as well as the radial direction.

With the method according to this invention a method of testing the quality of motor vehicle tires is utilized, with which also the moments acting in the foot print area of the tire are determined with the aid of measurements of the forces acting in radial, tangential and lateral direction. With the method according to the invention the vector sums are calculated from the instantaneous values of the radial and lateral force variations and different values fed into the material-removing systems according to amount and angle. The method according to the invention can be applied elegantly and easily by carrying out a removal of material oriented either in radial or in lateral direction, which is intensified as against the other direction. The intensified removal of material oriented in one direction is preferably about twice as great as that in the other direction. This can preferably be carried out by removing about double the usual amount of material after every or every second rotation of the tire. During the removal of material the instantaneous values of the lateral as well as of the radial forces are measured constantly.

A further possibility of applying the method according to the invention consists in removing material in one of the two directions (lateral, radial) until the forces acting in the other direction become essentially influenced on account of the removal of material, and in removing material at correspondingly displaced points of the motor vehicle tire when such a change of the forces in the other direction occurs. When the removal of material oriented in one direction (lateral or radial) has been terminated, compensation is carried out in the other direction.

With the device of the kind mentioned in the beginning, the above object is achieved according to the invention by providing two grinding wheels which can be placed on the tire shoulders and which can be controlled separately in accordance with the determined instantaneous values of the lateral and radial forces. The invention thus features two adjustable grinding units into which values can be fed separately. For constructional reasons these grinding units can be arranged on the tire circumference displaced with respect to each other. In this case the removal of material is effected at the tire shoulders, whereby the angular position of the grinding wheels as against the tire surface can be variable.

Several material-removing units may also be provided, which are used either for reducing the radial or the lateral force variations. Besides, the removing units may be arranged at optional points on the tire circumference. For the control of the grinding units by means of the force-measuring units, the peak-to-peak values of the force variations or the harmonics of the order one to "$n$" may be utilized.

The invention describes a method of improving the quality of tires, especially motor vehicle tires, with which not only the force acting on the tire in radial direction but also the forces acting in lateral direction and the moments are taken into consideration, and with which a corresponding removal of material is effected. With the invention the force variations and the arising moments are rapidly and steadily reduced to a permissible tolerance range. When utilizing the invention, improvement of the tire quality is either effected by reducing the force variations, or by reducing the force variations and considering the additionally arising moments at the same time.

Furthermore the so-called cone effect can be taken into consideration when improving the quality of motor vehicle tires. This effect occurs, e.g., with radial carcass tires because of the eccentricity of the carcass in the tire. When measuring the cone effect the tire is rotated in two directions and the portions of static lateral force are measured and stored, with subsequent arithmetic formation of the mean values. The stored values are then fed to a comparator which decides whether a compensation is necessary.

The figures serve for further explaining the invention.

FIG. 3 is a block diagram of a measuring unit, by means of which the method according to the invention can be applied.

Figure 1:
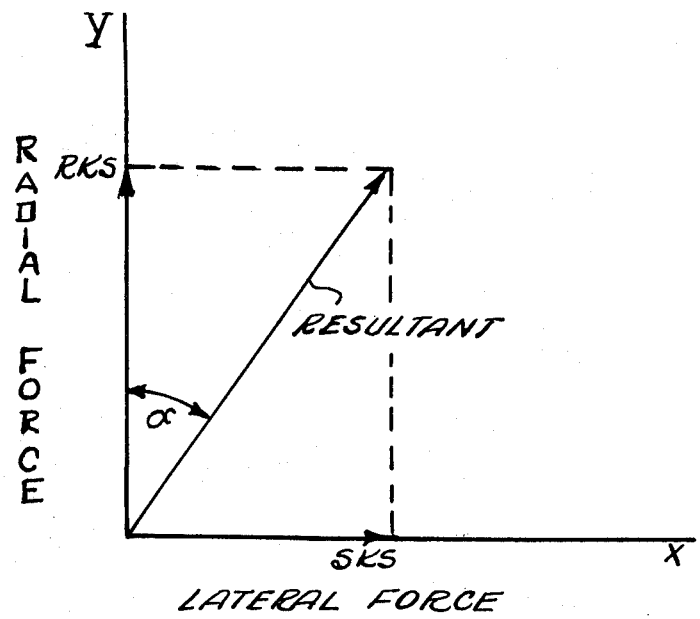
FIG. 1 illustrates the vectors of the lateral and radial force variations as well as the resulting vector of the force variation.

FIG. 1 shows, in the direction "$x$", a typical vector of lateral force variation SKS and in the direction "$y$" a typical vector of the radial force variation RKS. The vector resulting from these two force variation vectors forms with the vector of the radial force variation an angle $\alpha$ given by the equation $\tan \alpha = SKS/RKS$. At the same time it is stated whether the angle $\alpha$ is mathematically located in the first quadrant or in the fourth quadrant. With the marginal conditions $\alpha = 90°$, RKS $= 0$, so that removal of material or grinding resp. can be effected, by a grinder which is orientated in the lateral direction only. If $\alpha = 0$, then SKS $= 0$, and removal of material or grinding resp. is carried out taking into account the radial direction only.

The measured values are determined continuously so that the material-removing units or the grinding units respectively are always controlled in accordance with the instantaneous values. If an angle $\alpha = 45°–90°$ appears, this means that the radial force variations RKS are smaller than the lateral force variations SKS. In this case grinding should be carried out only in a lateral direction. According to the determined angle value $\alpha$ one grinding unit is moved against the tire with an advance stronger than that of the other grinding unit, whereby the difference between the forces of advance is the greater the more the angle $\alpha$ approaches 90°. Preferably one proceeds in such a way that the one grinding unit is approached to the tire with a force exceeding that of the other grinding unit by the factor of at least two; thus good values are obtained.

If the range of the angle $\alpha$ lies between 0° and 45°, the radial force variations RKS exceed the lateral force variations SKS. In this case material is mainly removed in the radial direction by approaching the two grinding wheels to the tire with the same force of advance. The intensified or double advance by which the one grinding unit is approached to the tire, may be effected with every, preferably with every second rotation of the tire. As there is no constant function between the radial and lateral force variations on account of the different thicknesses of rubber caused by inlays in the tire, a continuous measurement and verification of the material-removing influence on the tire quality is preferably carried out.

With the second mode of applying the method according to the invention, the grinding units are controlled on the basis of separate measuring procedures, i.e. at first the radially orientated and then the laterally orientated reduction of the non-uniformities or static forces respectively of the tire is carried out. A continuous measurement is carried out in order to determine the reciprocal influence or retro-active effect respectively which has occurred during the grinding just carried out. When, e.g., the maximum force variation arising in the radial direction is reduced, the effects on the lateral force variations are measured at the same time. If the measuring result lies in the requested direction, i.e. if during the reduction of the radial force variations the lateral force variations are influenced not at all or only a little, grinding at this point may be continued until the radial force variations lie within the tolerance range. If, however, the lateral force variations increases, removal of material is carried out at a displaced point on the tire surface, i.e. the position of the grinding wheel as against the tire tread is changed by modifying the angle adjustment of the grinding wheel with respect to the tire tread. After the radial force variations have been reduced until they lie within the tolerance range, the radial force variations are compensated in the same way.

Figure 2:
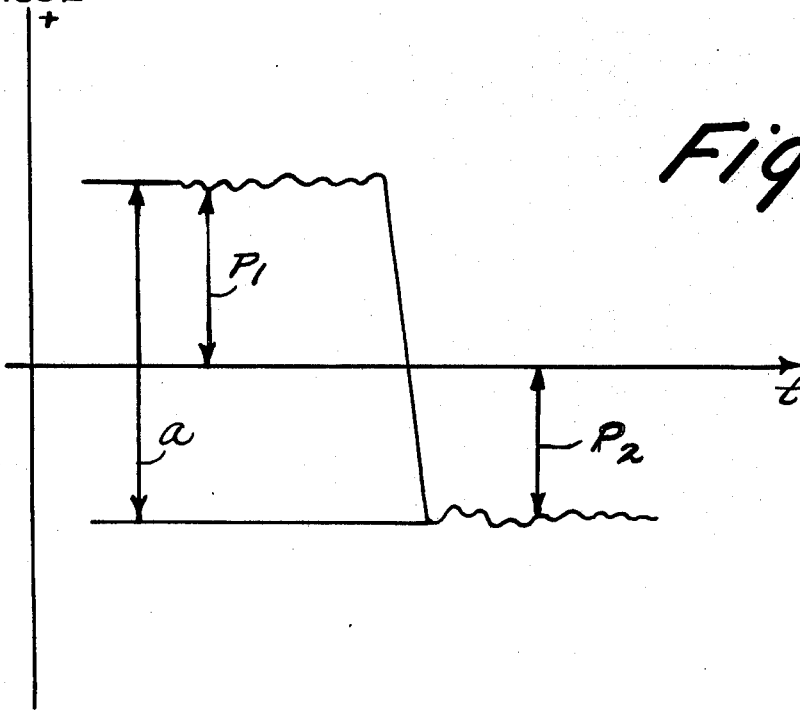
FIG. 2 shows the static lateral forces which may arise with different senses of rotation and on the basis of which the cone effect may be determined.

FIG. 2 shows the static lateral forces $P_1$ and $P_2$ determined in the course of the two measuring runs in different directions. $P_1$ is the static lateral force acting in the one sense of rotation, and $P_2$ is the static lateral force acting in the other sense of rotation. The stored measured values are compared with each other in a comparator, and it is then decided whether compensation should be carried out. If, e.g., $P_1 = P_2$, the cone effect $= 0$. In this case a compensation is not required. If $P_1 \neq P_2$, material must be removed over the whole tire circumference within the shoulder range. This removal results in a shifting of the level of the zero line of the static lateral force, whereby the distance $a$ shown in the figure remains unchanged. Thus only the amounts of $P_1$ and $P_2$ change so that on the basis of the determination of sign a change of the cone effect is caused and registered. The effect is constantly examined during the removal procedure, without a new measuring in two senses of rotation being required. In addition, both values may be fed to a comparator which terminates the removing procedure when, e.g., $P_1 = -P_2$ or $P_1 = -kP_2$ respectively, with $0 < k < 1$, whereby the factor k is predetermined as a limiting value.

A device suitable for applying the method according to the invention is shown as block diagram in FIG. 3. For measuring the radial forces, the following instruments are provided: one conventional 2-component pressure cell 1, test amplifiers 3 and 4 for each component, one serially connected integrator 7 and one conventional separating unit for the static components. Similarly, for measuring the lateral forces, one 2-component pressure cell 2, two test amplifiers 5 and 6 for each component, one serially connected integrator 8 and one conventional separating unit for the static components are provided.

The outputs of the separating units 9 and 10 are connected to a conventional divider circuit 11, whereby $\tan \alpha$ is determined from the vectors of the lateral and radial force variations SKS and RKS. At the output of the divider a conventional storing device 12 is provided and as the output of storing device 12 limiting value preselectors 13, 14 and 15 are provided for the different limiting values $\tan \alpha_1$, $\tan \alpha_2$, and $\tan \alpha_3$. These values are chosen as described to effect control as described. The outputs of these preselectors are connected to a control logic unit 16. A servo control 17 of the removing unit is connected to the outputs of the logic unit 16.

Furthermore, at one output of the separating unit 10 a peak value rectifier 18 is connected, at the outputs of which a conventional storing unit 19 is located. The storing unit 19 is connected to the logic unit 16.

The system shown in FIG. 3 operates as follows. The voltages delivered by the 2-component pressure cells 1 and 2 and corresponding to the individual forces, are amplified in the measuring amplifiers 3, 4, 5, 6 and then summed up in the integrators 7 and 8. In the conventional separating units 9 and 10 the static components, e.g. in radial direction the load and in lateral force variations located at the outputs of the separating units 9 and 10, are fed to the divider 11 where the corresponding tan α is determined. This value is stored in the storing device 12 and also fed to the limiting value preselectors 13, 14 and 15. According to the adjusted limiting value preselection for tan α the servo control 17 for the removing unit receives through the logic unit 16 the command to carry out a removal of material on the basis of radial or lateral signals.

The peak value rectifier 18 gives the information whether in a lateral removing procedure the left or the right tire shoulder must be ground. This is carried out according to the direction of the vector for the lateral force variations SKS which furnishes corresponding positive or negative voltage values. These values are fed to the logic unit 16 through the storing device 19.

What is claimed is:

1. Apparatus for producing a removal electrical signal indicating the amounts of material to be removed from a loaded tire in both lateral and radial directions comprising:

means for detecting the lateral forces and producing a first electrical signal which varies as a function of the detected force, means for detecting the radial forces and producing a second electrical signal which varies as a function of the detected force, means for dividing and first signal by said second signal to produce a tangent electrical signal which varies as a function of the tangent of the angle between the vector representing said radial and lateral forces and the vector representing said radial force, means for preselecting a plurality of tangent values and producing preset electrical signals representing said preset values, and means for comparing said preset signals with said tangent signals and producing said removal signal as a function thereof.

2. Apparatus as in claim 1 further including means for detecting and storing the peak value of said lateral force and wherein said comparing and producing means includes means for varying said removal signal as a function of said peak value.

3. Apparatus as in claim 1 wherein said detecting and producing means each include a pressure cell, means for amplifying the output of said pressure cell to produce an amplified signal, means for integrating said amplified signal and means for separating the respective radial and lateral vector signals from the integrated signal to produce said respective first and second signals.

* * * * *